(12) United States Patent
Siu et al.

(10) Patent No.: US 12,216,809 B2
(45) Date of Patent: Feb. 4, 2025

(54) PROCESSING PART OF A USER INPUT TO PRODUCE AN EARLY RESPONSE

(71) Applicant: Microsoft Technology Licensing, LLC, Redmond, WA (US)

(72) Inventors: Chun Hin Nelson Siu, Woodinville, WA (US); Hosam Adel Khalil, Issaquah, WA (US); Ajoy Nandi, Redmond, WA (US); Carmen Quan, Seattle, WA (US); Denis Fisenko, Redmond, WA (US); Md Nizam Uddin Chy, Seattle, WA (US); Min Hu, Redmond, WA (US); Christopher Hakan Basoglu, Everett, WA (US); Sayan Dev Pathak, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 206 days.

(21) Appl. No.: 17/364,254

(22) Filed: Jun. 30, 2021

(65) Prior Publication Data

US 2023/0004213 A1 Jan. 5, 2023

(51) Int. Cl.
*G06F 3/01* (2006.01)
*G06F 3/16* (2006.01)

(52) U.S. Cl.
CPC ............... *G06F 3/01* (2013.01); *G06F 3/167* (2013.01)

(58) Field of Classification Search
CPC ......... G10L 13/02; G10L 13/06; G10L 13/08; G10L 15/005; G10L 15/01; G10L 15/08; G10L 15/06; G10L 15/04; G10L 15/02; G10L 15/20
See application file for complete search history.

(56) References Cited

U.S. PATENT DOCUMENTS

| | | | |
|---|---|---|---|
| 10,726,830 B1* | 7/2020 | Mandal | G10L 15/16 |
| 2021/0110824 A1* | 4/2021 | Lim | G10L 15/24 |
| 2021/0125604 A1* | 4/2021 | Lin | G10L 15/1807 |
| 2021/0134299 A1* | 5/2021 | Bender | G06N 5/045 |
| 2021/0319780 A1* | 10/2021 | Aher | G10L 25/63 |
| 2022/0157314 A1* | 5/2022 | Varshney | G06F 16/90332 |

* cited by examiner

*Primary Examiner* — Michael A Faragalla

(57) ABSTRACT

Techniques are provided for early processing of a part of a user input to produce a response to the entire or final user input. While the user input is being received, a partial user input, which is a part of the final user input, is processed to produce a response. The response is a candidate response for the final user input. After the final user input is received, and if the partial user input is determined to match or be equivalent to the final user input, the first response, which is already available, is provided to one or more output devices for presentation. If the final user input is determined to differ from the partial user input, the final user input is processed to produce a second response to the final user input, and the second response is provided for presentation. In some instances, multiple partial user inputs are received and processed.

20 Claims, 11 Drawing Sheets

PROCESSING PART OF A USER INPUT TO PRODUCE AN EARLY RESPONSE

BACKGROUND

Many software applications today are able to receive spoken inputs, gesture inputs, and/or text inputs ("user inputs"). The user inputs can be commands, requests, search queries, shortcut inputs (e.g., function keys) and the like. After inputting the user input, the user provides an indication of the end of the entry of the spoken or text input, such as not typing or speaking for a given period of time or by inputting an "enter" or a "return" command. The user input is then processed to provide a response to the user input. Thus, applications or systems must wait to receive the entire user input before the user input can be processed.

SUMMARY

Embodiments disclosed herein provide techniques for early processing of a part of a user input to produce a response to the entire or final user input (referred to herein as "final user input"). The user input can be any input that is processed or acted upon. Example user inputs include, but are not limited to, search queries, requests, commands, and shortcuts. While the user input is being received, a partial user input, which is a part of the final user input, is processed to produce a first response. The response is a candidate response for the final user input. After the final user input is received, and if the partial user input matches, or is determined to be equivalent to, the final user input, the first response is provided to one or more output devices for presentation. If the final user input is determined to differ from the partial user input, the final user input is processed to produce a second response to the final user input, and the second response is provided for presentation.

In one aspect, a method includes receiving a user input. The user input may be received as a spoken user input, a text user input, a gesture user input, or another type of user input. During a time period in which the user input is received, a triggering condition associated with the user input is detected. The part of the user input that is received when the triggering condition is detected constitutes a partial user input. The partial user input is caused to be processed and a response to the partial user input is received. For example, the partial user input may be processed by the application that received the user input, or the partial user input can be transmitted to one or more other applications for processing. All of the user input is received to produce a final user input. A determination is made as to whether the partial user input matches or is equivalent to the final user input. In one embodiment, the partial user input is compared to the final user input to determine if the partial user input matches or is equivalent to the final user input. When a determination is made that the partial user input matches or is equivalent to the final user input, the response is provided for presentation. The response can be provided to one or more output devices, such as a display.

In another aspect, a system includes a processing device and a storage device operably connected to the processing device. The storage device stores instructions, that when executed by the processing device, cause operations to be performed. The operations include receiving a user input and detecting a triggering condition that is associated with the user input. The triggering condition is detected during a time period in which the user input is received. The part of the user input that is received when the triggering condition is detected constitutes a partial user input. The partial user input is caused to be processed and a response to the partial user input is received. All of the user input is received to produce a final user input. Based on a determination that the partial user input matches or is equivalent to the final user input, the response is provided for presentation. The response can be provided to one or more output devices, such as a display.

In yet another aspect, a method includes receiving a user input and detecting a first triggering condition for the user input. The first triggering condition is detected during a time period in which the user input is received. The first part of the user input that is received when the first triggering condition is detected constitutes a first partial user input. The first partial user input is provided for processing and a first response to the first partial user input is received. A second triggering condition for the user input is detected. The part of the user input that has been received when the second triggering condition is detected constitutes a second partial user input (e.g., the first partial user input and the part received when the second triggering condition is detected). The second partial user input is provided for processing and a second response to the second partial user input is received. All of the user input is received to produce a final user input. Based on a determination that the second partial user input matches or is equivalent to the final user input, the second response is provided to an output device.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following Figures. The elements of the drawings are not necessarily to scale relative to each other. Identical reference numerals have been used, where possible, to designate identical features that are common to the figures.

DETAILED DESCRIPTION

Figure 1:
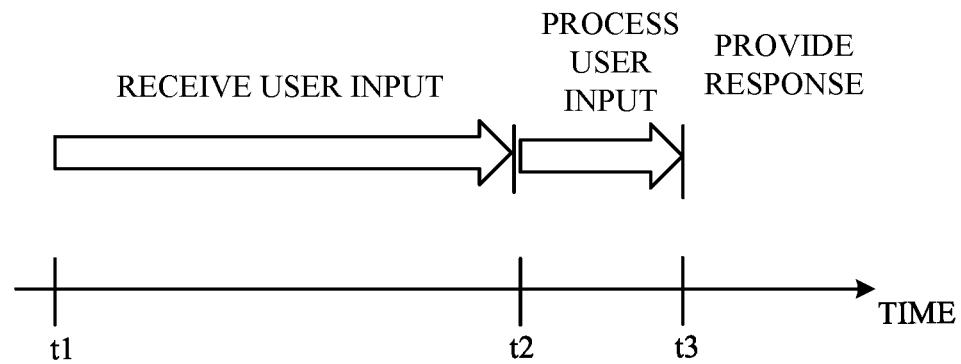
FIG. 1 illustrates a first process flow of processing a user input in accordance with some embodiments.

In the following detailed description, references are made to the accompanying drawings that form a part hereof, and in which are shown by way of illustrations, specific embodiments, or examples. These aspects may be combined, other aspects may be utilized, and structural changes may be made without departing from the present disclosure. Embodiments may be practiced as methods, systems, or devices. Accordingly, embodiments may take the form of a hardware implementation, an entirely software implementation, or an implementation combining software and hardware aspects. The following detailed description is therefore not to be taken in a limiting sense, and the scope of the present disclosure is defined by the appended claims and their equivalents.

Generally, embodiments disclosed herein provide techniques for early processing of one or more parts of a user input while the user input is being received. Processing of a part of the user input produces a response to the part of the user input. The response is a candidate response for the final user input. The user input can be any input that is processed or acted upon. Example user inputs include, but are not limited to, requests, search queries, dictation with inline commanding, commands, and shortcuts.

One or more triggering conditions are detected in the user input while the user input is received, which causes the part of the user input that has been received at the time of the detection to be a partial user input. The triggering condition can be within the partial user input or may be one or more characteristics associated with the partial user input. As will be described in more detail later, a triggering condition can include, but is not limited to, a gap or a pause within the spoken or typed user input (e.g., the user stops speaking or typing for a given period of time), a linguistic feature in the user input (e.g., a specific word or words), an expected user input (e.g., a prediction of the content of the user input), and the lapse of an amount of time.

The partial user input is processed to produce a first response while the user input continues to be received. The first response is a candidate response for the final user input. If the partial user input is determined to match, or to be equivalent to, the final user input, the first response, which is already available, is provided to one or more output devices for presentation. Generally, a partial user input is "equivalent" to a final user input when the partial user input matches or is determined to be sufficiently similar to the final user input. For example, a classifier may be used to compare the partial and the final user inputs and determine whether the partial and the final user inputs are considered equivalent. If the final user input is determined to differ from the partial user input, the final user input is processed to produce a second response to the final user input. The second response is then provided for presentation.

In some instances, multiple partial user inputs are created before the final user input is received (e.g., while a text or audio stream of the user input is received). The multiple partial user inputs are processed to produce responses to the partial user inputs. If the last received partial user input is determined to be equivalent to the final user input, the response to that partial user input is provided to an output device for presentation. When it is determined that none of the partial user inputs match or are equivalent to the final user input, the final user input is processed to produce a response, and the response is provided to one or more output devices for presentation.

When the partial user input is equivalent to the final user input, the processing of the partial user input to produce a candidate response can cause a response to the final user input to be presented to a user more quickly. In some instances, such as when the amount of time needed to process the final user input is large, the early processing of the partial user response can conceal that large amount of processing time. For example, in a non-limiting nonexclusive example, if the amount of time needed to process a final user input is five hundred milliseconds, and processing of a partial user input that is equivalent to the final user input begins three hundred milliseconds earlier, the user will experience a two hundred millisecond wait for a response to the final user input. Since the three hundred millisecond processing time of the partial user input occurs during the time period the user is submitting the final user input, the user is unaware of that three hundred milliseconds processing time.

In some embodiments, the user input is analyzed continuously to detect a partial user input. Thus, in some instances, the partial user input that is received last in time can be the final user input when an indication that the user has finished entering the user input has not yet been received. For example, the user may not have submitted an "enter" or a "return" command, or the requisite amount of time in which the user does not type or speak may not have passed. Accordingly, in such embodiments, the partial use input matches the final user input, and the processing of the partial user input (which matches the final user input) begins earlier than the processing of the final user input would have begun. Again, a response to the final user input can therefore be presented to the user in less time. In other embodiments, the user input can be analyzed at selected times.

The determination of whether a partial user input matches or is equivalent to the final user input can be based on a range of equivalency levels. For example, some systems can be very conservative in this determination by requiring the partial user input to match, character by character, the final user input. Other systems can be less conservative and base the determination on whether the final user input includes one or more words that render the final user input literally different from the partial user input but not functionally different from the partial user input. For example, a classifier may be used to compare the partial and the final user inputs and determine whether the partial and the final user inputs are considered equivalent.

In some embodiments, the type of user input can affect the level of equivalency that is used. For example, a partial user input may be more likely to match or be equivalent to the final user input when the user input is a command to perform an action (e.g., turn off music) than a request that includes one or more requirements (e.g., a date, a time, a name of a person). Additionally or alternatively, the domain in which the user input is associated with may affect the level of equivalency that a system requires between a final and a partial user input. Some domains, such as the weather domain, can have more frequently used user inputs (e.g., what is today's weather forecast) compared to other domains, such as a travel domain where user inputs can have multiple requirements.

Technical advantages of the disclosed embodiments include providing a response to a user input more quickly. At least a portion of the time that is required to process a user input can be concealed from the user. The shorter response time can improve the user experience in that the amount of time the user waits for a response is reduced. Thus, search results may be provided more quickly and/or commands can be executed more quickly.

FIG. 1 illustrates a first process flow of processing a user input in accordance with some embodiments. A user input is received during the time period t1 to t2 ("user input time period"). The user input can be received via a spoken input, a text input, a touch input, a gesture input, or by another input mechanism. After the final user input is received at time t2, the user input is processed by an application between the time period t2 to t3 ("processing time period"). A response to the final user input is produced at time t3. In a non-limiting nonexclusive embodiment, the user input is a search query for a search operation. The search query is received during the user input period. The search operation is executed during the processing time period and the search results are produced at time t3.

In embodiments disclosed herein, one or more partial user inputs are processed during the user input time period. If at least one partial user input matches the final user input, the response from that partial user input is provided (or caused to be provided) for presentation on an output device. In one embodiment, the response that is presented to the output device is the response to the partial user input that is received last in time.

Figure 2:
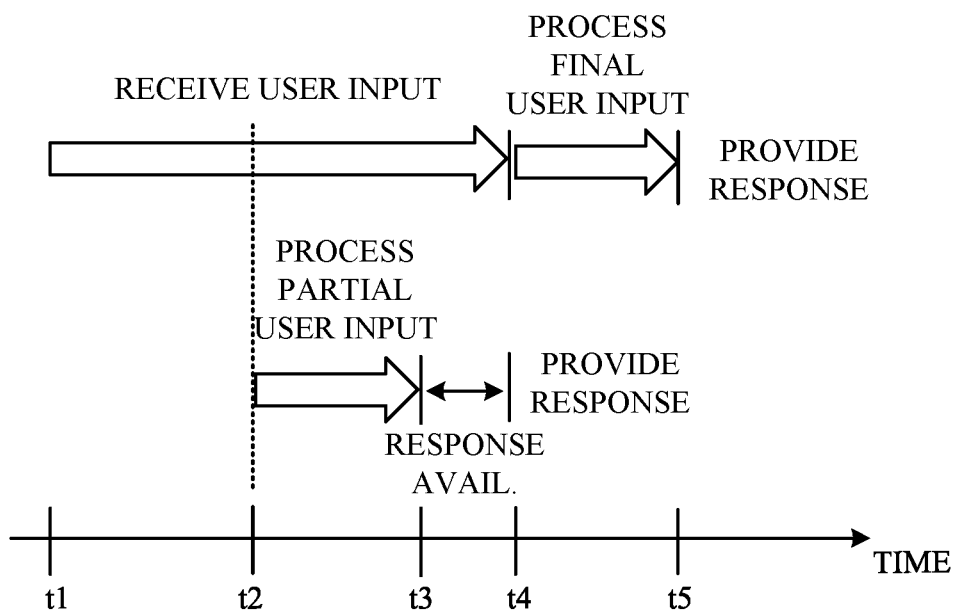
FIG. 2 illustrates a second process flow of processing a user input in accordance with some embodiments.

FIG. 2 illustrates a second process flow of processing a user input in accordance with some embodiments. FIG. 2 is described in conjunction with one partial user input, but other embodiments are not limited to this implementation. Multiple partial user inputs can be processed in other embodiments.

A user input is received during the user input time period (time t1 to t4). Similar to FIG. 1, the user input can be received via a spoken input, a text input, a touch input, a gesture input, or some other type of input. A triggering condition is detected at time t2 when only a part of the user input has been received. The triggering condition can be within the partial user input, may be one or more characteristics associated with the partial user input, or may be time-based. As will be described in more detail later in conjunction with FIG. 6, a triggering condition can include, but is not limited to, a gap or a pause within the spoken or typed user input (e.g., the user stops speaking or typing for a given period of time), a prosodic characteristic of the user input, a linguistic feature in the user input (e.g., a specific word or words), an expected user input (e.g., a prediction of the content of the user input), and the lapse of an amount of time.

The partial user input is processed between the times t2 to t3 to produce a first response at time t3. Thus, the first response is available at time t3 and is a candidate response for the final user input. The final user input is received at time t4. If the partial user input matches or is determined to be equivalent to the final user input, the response received at time t3 is provided to an output device. However, if the remaining part of the user input that is received between time t3 and time t4 provides one or more additional conditions or requirements to the partial user input, the partial user input and the first response can be discarded and the final user input is processed during the processing time period (between times t4 to t5) to produce a second response. The second response is then provided for presentation to an output device. Thus, processing the partial user input can enable a system to produce a response in less time compared to processing the final user input. In the illustrated embodiment, when the first response is provided for presentation, a time savings of time t4 to time t5 is realized (e.g., time t5−time t4=time savings).

In a non-limiting nonexclusive embodiment, a user may input a spoken user input of "schedule meeting at 10 on Tuesday with John." As the user is speaking the user input, an analyzer application (e.g., a speech recognition application) detects a triggering condition to create a partial user input of "schedule meeting at 10 on Tuesday." The partial user input is provided to an application for processing (e.g., a virtual assistant application) while the remaining part of the user input "with John" is received. Since the remaining part of the user input adds an additional condition to the partial user input, the partial user input "schedule a meeting at 10 am on Tuesday" is discarded and the final user input of "schedule meeting at 10 on Tuesday with John" is provided to the application for processing to cause the meeting to be scheduled.

Figure 3:
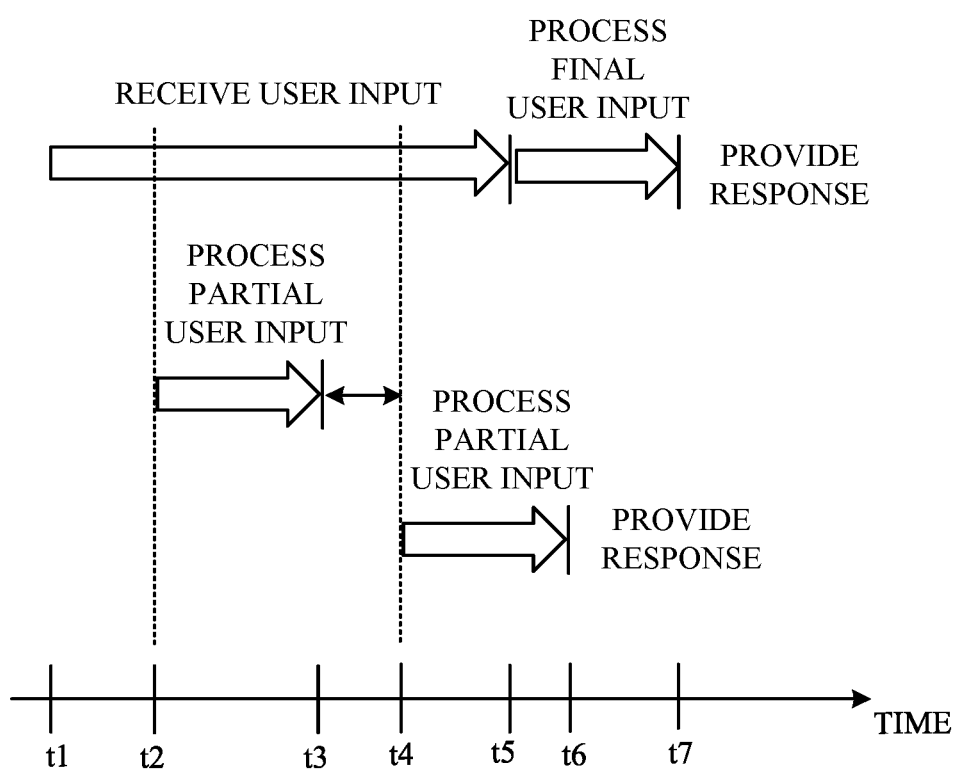
FIG. 3 illustrates a third process flow of processing a user input in accordance with some embodiments.

FIG. 3 illustrates a third process flow of processing a user input in accordance with some embodiments. The process shown in FIG. 3 is similar to the process of FIG. 2 except that there are two partial user inputs. A user input is received during the user input time period (time t1 to time t5). A first triggering condition is detected at time t2 when only a first part of the user input has been received. The first partial user input is processed between the times t2 to t3 to produce a first response at time t3. Thus, the first response is available at time t3.

A second triggering condition is detected at time t4 when a second part of the user input has been received. In one embodiment, the second partial input includes the first partial input and the second part of the user input, the first partial user input and the first response are discarded, and the second partial user input is processed during the processing time period (between times t4 to t6) to produce a second response. In the illustrated embodiment, the processing of the second partial user input begins before the final user input is received at time t5 and continues until time t6, a time that is after time t5.

Processing of the final user input begins at time t5. In some embodiments, when the second partial user input matches the final user input, processing of the final user input ends and the second response is provided after time t6 for presentation. Thus, a time savings of (time t7−time t6) is realized. Alternatively, when the second partial user input matches the final user input, processing of the final user input continues until time t7 to produce a third response, but the second response is provided for presentation after time t6 and the third response is discarded. Again, a time savings of (time t7−time t6) is obtained.

If the final user input is determined to differ from the second partial user input, the second partial user input and the second response may be discarded, and the final user input is processed to produce a third response. The third response is provided for presentation after time t7.

Figure 4:
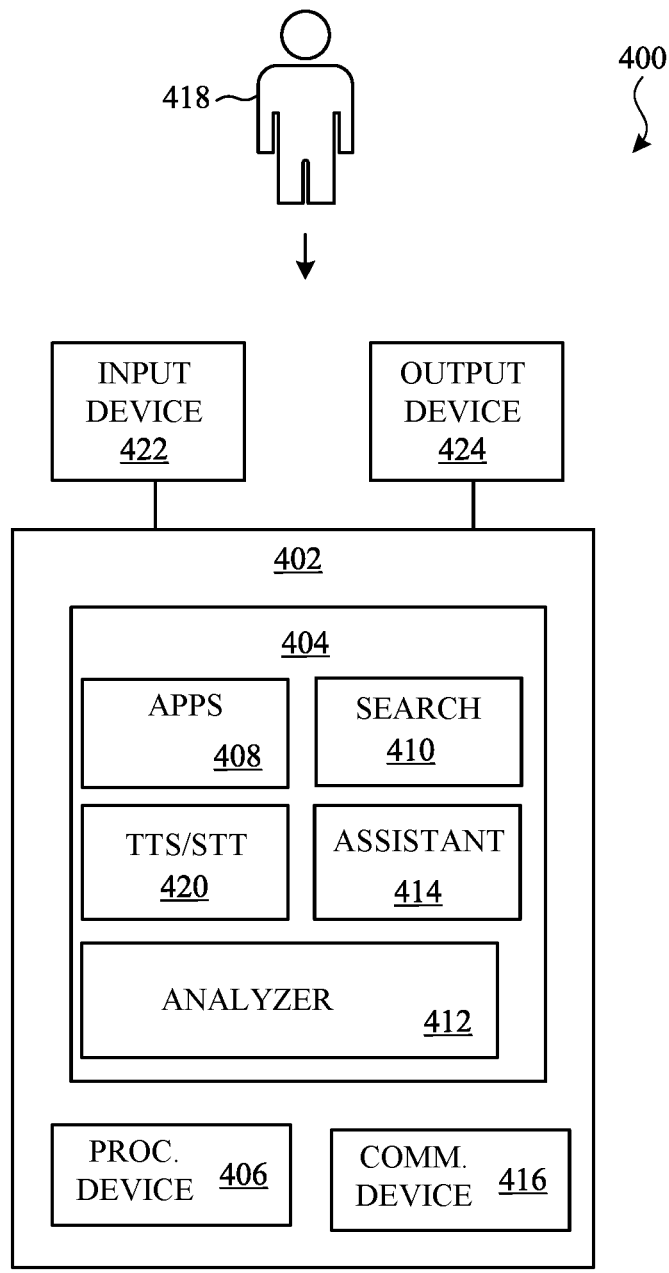
FIG. 4 illustrates a block diagram of a first system in which aspects of the present disclosure may be practiced.

FIG. 4 illustrates a block diagram of a first system in which aspects of the present disclosure may be practiced. The system 400 includes a computing device 402 that includes one or more storage devices (collectively referred to as storage device 404) and one or more processing devices (collectively referred to as processing device 406). The storage device 404 stores computer-executable instructions or one or more software applications 408, a search application 410, an analyzer application 412, and a virtual assistant application 414. The search application 410 is operable to perform intranet and/or internet searches using communication device 416. In one embodiment, the analyzer application 412 is operable to recognize text that is in or represents a user input that is received by the computing device 402 from a user 418, triggering conditions within or associated with the text, and determine the equivalency of partial user inputs to final user inputs. The virtual assistant application 414 is an intelligent assistant that is operable to perform or execute operations, such as tasks and commands. A non-limiting nonexclusive example of a virtual assistant application 414 is MICROSOFT CORTANA. In some embodiments, the analyzer application 412 is included in the software application(s) 408, the search application 410, and/or the virtual assistant application 414.

The user 418 interacts with the software application(s) 408, the search application 410, and/or the virtual assistant application 414 to perform various activities. The activities can include sending, receiving, redirecting, creating, modifying, deleting, and viewing electronic communications, such emails, text messages, instant messages, online chats, video messages, audio messages, and posts in social media. The activities may further include: (1) creating, deleting, viewing, and/or editing documents; (2) creating, deleting, viewing, and/or editing and calendars; (3) organizing and/or attending meetings; (4) setting, modifying, deleting, monitoring, and/or completing tasks; and/or (5) setting, modifying, and/or deleting reminders.

A text-to-speech (TTS) and speech-to-text (STT) application 420 is stored in the storage device 404. The TTS application is operable to convert text into speech (an audio output). The STT application is operable to recognize and convert speech (an audio input) into text.

In some embodiments, the analyzer application 412 includes one or more machine learning mechanisms (e.g., models, algorithms, or applications) that are operable to detect one or more triggering conditions in a user input and to determine the equivalency of a partial user input to the final user input. Generally, the analyzer application 412 use natural language processing to detect the one or more partial user inputs. The machine learning mechanism(s) is adaptable over time such that the analyzer application 412 learn and become more efficient and effective at detecting partial user inputs, determining a partial user input is to be processed while the remaining part of a user input is received, and determining whether a partial user input is equivalent to a final user input. In a non-limiting nonexclusive example, the machine learning mechanism(s) learns over time based on the user's 418 interactions with the presentation of the responses to the partial user inputs, information the user 418 accesses or interacts with, and other types of user interactions.

A user input is received at the computing device 402 through one or more input devices (collectively referred to as input device 422). As discussed earlier, the user input can be a question, a shortcut, a statement, a command, a request, or other input that will cause one or more applications 408, the search application 410, and/or the virtual assistant application 414 to provide one or more responses to one or more output devices (collective referred to as output device 424). In one embodiment, the application that receives the user input processes the user input to provide a response. Additionally or alternatively, the application that received the user input can provide the user input to one or more other applications for processing and a response to the user input is received by the application that received the user input.

The input device 422 and the output device 424 can each be included in the computing device 402 or may be operably connected to the computing device 402. An example input device 422 includes, but is not limited to, a touchscreen, a microphone (e.g., in combination with STT application 420), a physical or a virtual keyboard, and a wireless stylus. An example output device 424 includes, but is not limited to, a display, a speaker (e.g., in combination with TTS application 420), a printer, a television, and a projector.

The user 418 can input user inputs to the computing device 402 using an input device. The user input can be input as an audio input (e.g., a spoken user input), a text input (e.g., typed text), and one or more gestures (e.g., a slide or a swipe type input). When the user input is input as an audio input, the STT application 420 coverts the audio to text prior to processing by the analyzer application. The analyzer application 412 processes the text in real-time (or substantially real-time) to detect one or more triggering conditions in or associated with the user input. As will be described in more detail later in conjunction with FIG. 6, a triggering condition can be a gap or a pause within the spoken or typed user input (e.g., the user stops speaking or typing for a given period of time), a prosodic characteristic of the user input, a linguistic feature in the user input (e.g., a specific word or words), a prediction of the content of the user input, a lapse of time, and so on. When the analyzer application 412 detects a triggering condition, the analyzer application 412 can treat the part of the user input that has been received as a partial user input and send the partial user input to an application for processing to produce a first response. In some embodiments, the analyzer application 412 analyzes the part of the user input that has been received to determine if that part should be treated as a partial user input or if more of the user input should be received. For example, as discussed in more detail in conjunction with FIG. 6, a demographic or regional characteristic may be considered when determining whether a triggering condition is met.

The remaining part of the user input continues to be received when the partial user input is processed. The first response is provided to the output device 424 when the partial user input corresponds to the final user input. When the final user input differs from the partial user input, the partial user input and the first response are discarded, and the final user input is provided to an application for processing to produce a second response to the final user input.

The computing device 402 can be any suitable type of computing device. Example computing devices include a laptop computer, a tablet, a mobile telephone, a smart phone, a smart watch, a wearable computer, a desktop computer, a gaming device/computer (e.g., Xbox), a television, or a server computing device. These example computing devices are for example purposes only and should not be considered as limiting.

Figure 5:
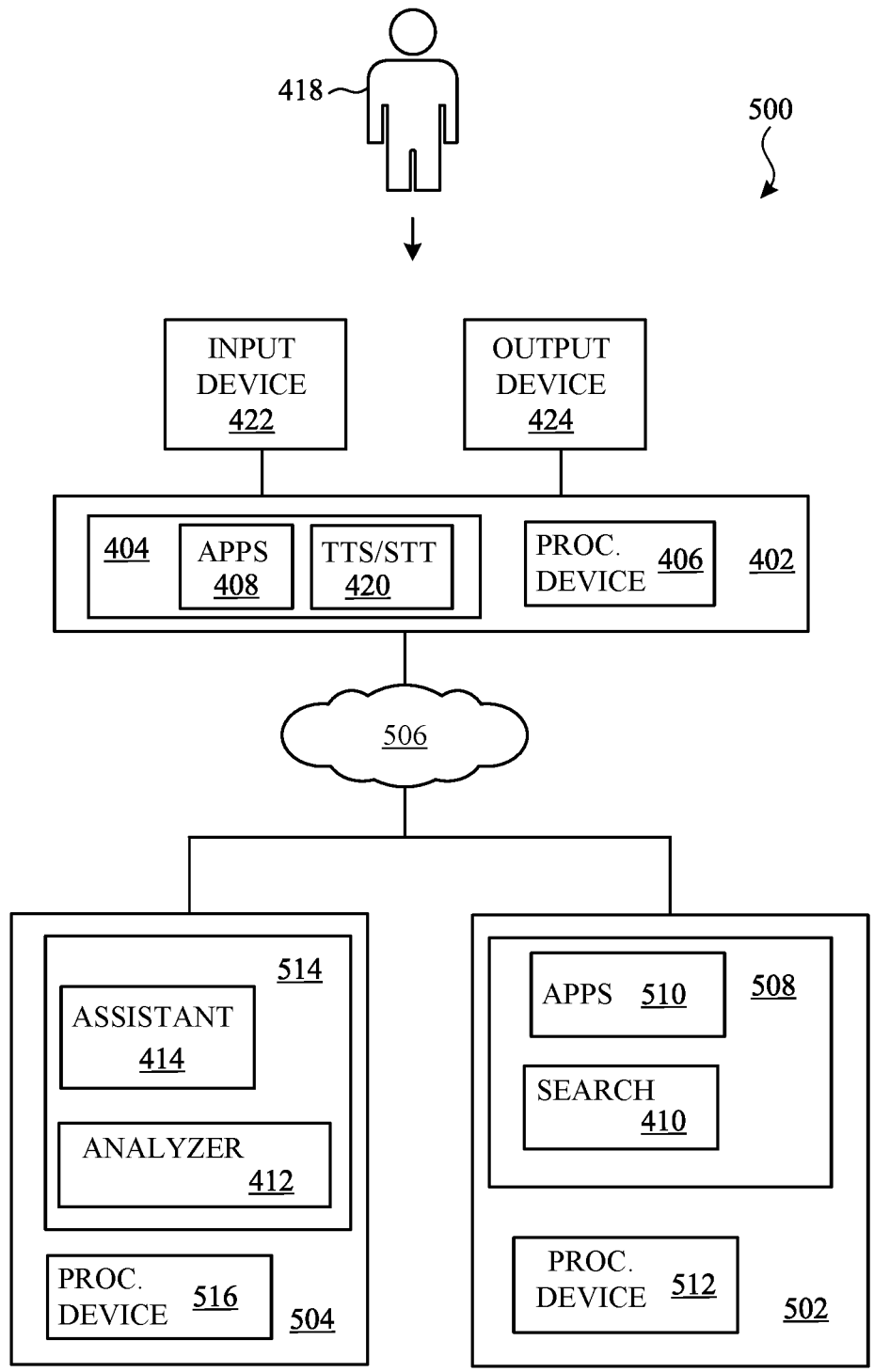
FIG. 5 illustrates a block diagram of a second system in which aspects of the present disclosure may be practiced.

FIG. 5 illustrates a block diagram of a second system in which aspects of the present disclosure may be practiced. The system 500 is a distributed system that includes the computing device 402, a second computing device 502, and a third computing device 504. The second and the third computing devices 502, 504 are each operably connected to the computing device 402 through one or more networks (collectively network 506).

The second computing device 502 includes one or more storage devices (collectively storage device 508) that stores one or more applications 510. The application(s) 510 can at least be one of the applications 408, or the application(s) 510 may differ from the applications 408. One or more processing devices (collectively processing device 512) are operable to execute the application(s) 510.

The third computing device 504 includes one or more storage devices (collectively storage device 514) that stores the analyzer application 412 and the virtual assistant application 414. One or more processing devices (collectively processing device 516) are operable to execute the assistant application 414. When executed by the processing device 516, the analyzer application 412 can receive STT data through the network 506 to detect one or more triggering conditions.

The network 506 is illustrative of any suitable type of network, for example, an intranet, and/or a distributed computing network (e.g., the Internet) over which the computing devices 402, 502, 504 may communicate with each other. Additionally, the computing devices 502, 504 can each be any suitable computing device, such as a mobile telephone, a smart phone, a tablet, a smart watch, a wearable computer, a personal computer a desktop computer, a laptop computer, a gaming device/computer (e.g., Xbox), a television, or a server computing device. Although FIG. 5 depicts three computing devices 402, 502, 504, other embodiments are not limited to this configuration. The system 500 can include any suitable number of computing devices.

Figure 6:
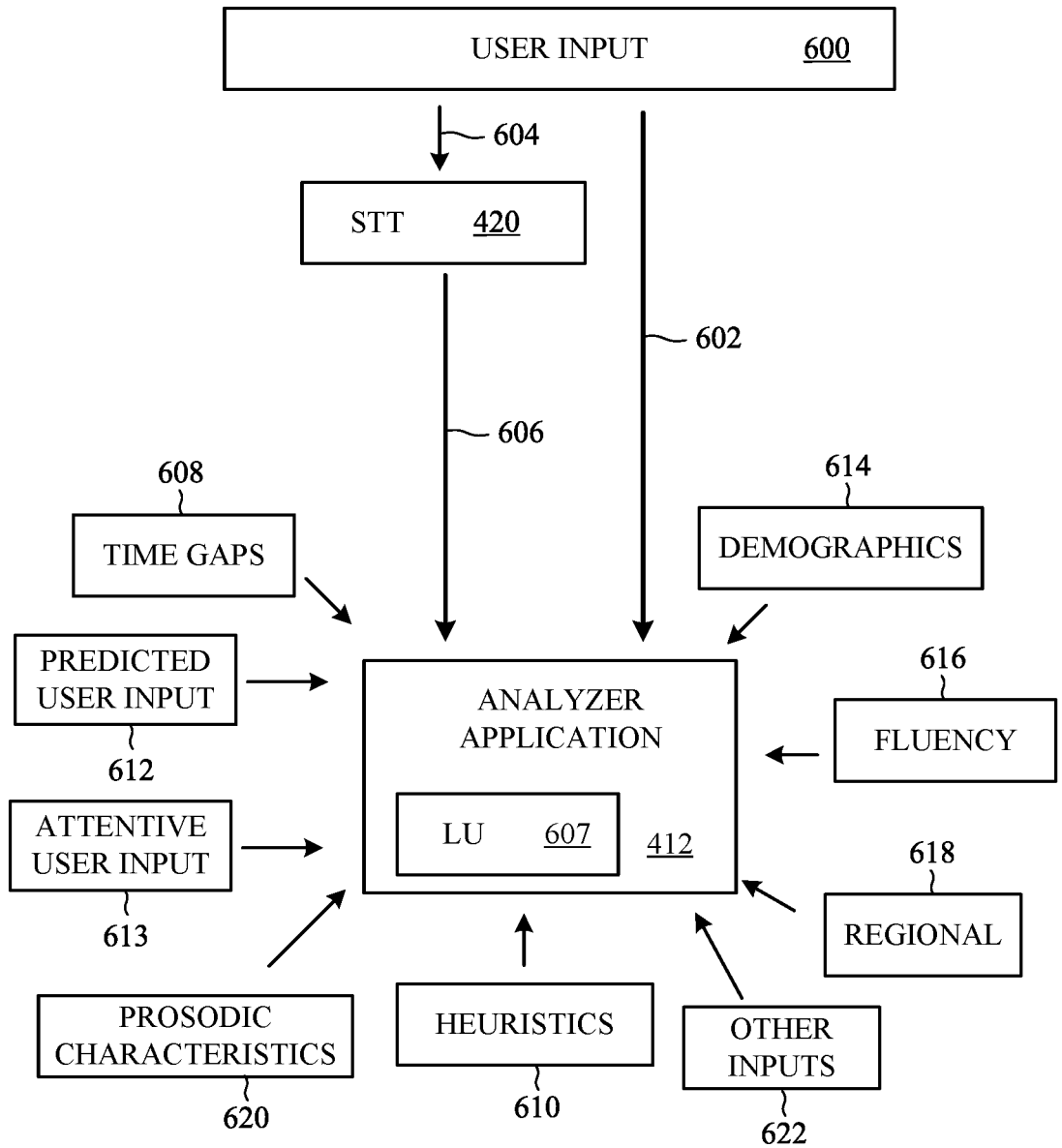
FIG. 6 illustrates example triggering conditions and elements that can be used to define or adjust the triggering conditions in accordance with some embodiments.

FIG. 6 illustrates example triggering conditions and elements that can be used to define or adjust the triggering conditions in accordance with some embodiments. The example triggering conditions are within a user input or are a characteristic of a user input and are detected by an analyzer application (e.g., analyzer application 412 in FIGS. 4 and 5). Embodiments can require that a single triggering condition is to be met or a combination of triggering conditions are to be met to create a partial user input.

As discussed earlier, a user input 600 can be received as a spoken input or a text input. When the user input 600 is received as a text input, the analyzer application 412 receives the text input as a text stream 602. When the user input 600 is received as a spoken input, an STT application 420 converts the audio stream 604 into a text stream 606 that is received by the analyzer application 412. The analyzer application 412 analyzes the text stream 602, 606 in real-time or substantially real-time to detect one or more triggering conditions.

In some embodiments, the analyzer application 412 includes or is operably connected to a language understanding (LU) application 607. The language understanding application 607 is operable to analyze the text stream 602, 606 in real-time or in substantially real-time to determine whether the part of the text stream 602, 606 that has been received so far constitutes a partial user input or not. When the language understanding application 607 determines the received text stream 602, 606 forms a partial user input, the partial user input is provided for processing to produce a response to the partial user input.

A time gap 608 in the user input that equals or exceeds a given amount of time can be a triggering condition. Generally, the human ear can perceive a gap in speech of two hundred to two hundred and fifty milliseconds ("gap time period"). The time period for the analyzer application 412 can be the same, higher, or lower than two hundred to two hundred and fifty milliseconds. Additionally, the amount of time in the time gap 608 can be different for some users or for groups of users. For example, children can be given more time to submit a user input than adults, so the time gap for children may be longer than for adults. The time gap for users in geographic areas, such as cities, states, regions, or countries can vary based on the speech or communication patterns in the geographic areas.

As the text stream 602, 606 is received, the analyzer application 412 is reviewing the text stream 602, 606 to detect a time gap 608 in the text stream 602, 606 that at least meets the minimum time gap period. When the analyzer application 412 detects a time gap 608, the analyzer application can transmit, or can cause to be transmitted, the partial user input for processing.

One or more heuristics 610 may be a triggering condition. In a non-limiting nonexclusive embodiment, prior and current user inputs can be analyzed to determine the top N user inputs for one or more domains, where N is a number equal to or greater than one. A domain is associated with a specific topic or subject matter, where the subject matter is associated with tasks that are related to that specific subject matter. Example domains include, but are not limited to, weather, travel, stock quotes, ticket purchases, technical support, language learning, and restaurants. In the weather domain, for example, the user input of "what is the weather forecast" is a top user input. Using the top user inputs as a guide, the analyzer application 412 can be more aggressive in detecting a partial user input when the analyzer application 412 detects a user input that is currently being received is likely one of the top user inputs. Additionally or alternatively, a heuristic may be based on content typically included in a user input in general, and/or content typically included in a user input on a particular system (e.g., a MICROSOFT product versus a GOOGLE product).

A predicted user input 612 can be a triggering condition. A predicted user input 612 may be based on what typically constitutes a final user input. For such user inputs, the analyzer application 412 may determine a triggering condition has been met when an expected part or most of the user input is received. For example, when the user input begins with the phrase "set a reminder", a subject typically follows that phrase. Example subjects include a meeting, a lunch appointment, an event, a task, and the like. Thus, the analyzer application 412 may wait to detect a triggering condition until most, if not all, of the user input is received. Alternatively, when a user is playing audio (e.g., music), and the user input is "turn off the music", the analyzer application 412 can determine a triggering condition is met after "turn off the" is received.

An attentive user input 613 may be a triggering condition. Example attentive user inputs 613 include, but are not limited to, eye tracking and head tracking mechanisms (e.g., systems or applications). For example, a user may be typing a user input into a text box, such as a search field. The analyzer application 412 may detect the gaze of the user's eyes have shifted away from the text box or a display, or the analyzer application 412 can receive a signal from an eye tracking application or device. Based on the change in the gaze or the eye position of the user, the analyzer application 412 can determine if the part of the user input received at the time of the change in the user's gaze forms a partial input or not.

Demographics 614 associated with the user can be an element that is used to define or adjust one or more triggering condition. Characteristics such as age and education level may influence the triggering condition. In a non-limiting non-exclusive example, a text or spoken input by a child may be different from that of a teenager or an adult, and a text or spoken input from an adult can be different from that of a senior adult. The text or spoken input from the child can take more time than that of an adult because the child is learning words and how to construct the words into phrases or sentences. In some embodiments, the analyzer application 412 may define or adjust one or more triggering conditions (e.g., a time gap) to have additional time for the receipt of the text or spoken input from a child. Alternatively, the analyzer application 412 may provide less time for a triggering condition for a text or spoken input that is input by an adult.

The fluency 616 of a user input may be an element that is used to define or adjust one or more triggering conditions. In one embodiment, fluency 616 refers to a continuity, a smoothness, and/or an effort of the user input. For example, when the user input is received as a spoken input, the fluency 616 is speech fluency that refers to the continuity, smoothness, and/or effortlessness of the speech in the spoken input. For example, when a user stammers, stutters, hesitates, or mumbles, the analyzer application 412 may define or adjust one or more triggering conditions to have more time for the receipt of the user input before a determination is made that the triggering condition(s) is met.

Similarly, when the user input is received as a text input, the fluency 616 can be text fluency that refers to the continuity, rapidness, and accuracy of the entry of the text in the text input. For example, when the text entry is discontinuous or the user changes the text previously entered, the analyzer application 412 may define or adjust one or more triggering conditions to have more time for the receipt of the text input before a determination is made that the triggering condition(s) is met.

Regional features 618 associated with the user can be an element that is used to define or adjust one or more triggering conditions. The regional features 618 can be based on the educational levels of the people in a region, the speech or communication patterns in the region, and the like. The regional features can be local, national, and/or international. For example, the overall or average education level of a first country can be higher than for a second country. Compared to the first country, the analyzer application 412 operating in devices located in the second country can define or adjust one or more triggering conditions based on this regional characteristic. For example, the analyzer application 412 may define or adjust the triggering condition(s) to have additional time to receive a user input.

One or more prosodic characteristics 620 of the user input that is received as a spoken input may be an element that is used to define or adjust one or more triggering conditions. Example prosodic characteristics include, but are not limited to, accent, intonation, stress pattern, loudness variations, and rhythm. In some embodiments, the analyzer application 412 can define or adjust one or more triggering conditions based on one or more prosodic characteristics. For example, the analyzer application 412 may define or adjust the triggering condition(s) to have additional time to receive a user input.

Other inputs 622 may be a consideration in the determination of whether a triggering condition is met. The other inputs 622 can be associated with the computing device that is receiving the user input. The other inputs 622 include, but are not limited to, location data (e.g., GPS), an application that is executing on the computing device or producing an output of the computing device, or an input of the computing device. For example, if the location data indicates the user is located in a particular city (e.g., Boston), and the user input is "what is the weather forecast for Boston", the analyzer application 412 can determine a triggering condition is met when "what is the weather forecast" is received based on the location data. The analyzer application 412 may append "for Boston" to the partial user input of "what is the weather forecast." The response is provided in less time when the remainder of the user input is "for Boston." Otherwise, the final input is processed if the city is not Boston. For example, if the final user input is "what is the weather forecast for Dallas", the final input is processed.

Additionally or alternatively, the partial user input of "what is the weather forecast" may be used to prime or activate a weather service application or connection. The partial user input can be used to prepare the weather service application to provide a weather forecast for a location. The weather service application is then ready to receive the final result of "what is the weather forecast in Boston."

In another non-limiting nonexclusive example, a user may be listening to music that is output from a computing device. The analyzer application 412 may determine a triggering condition is met when the user input is a command to "turn off the music" and "turn off the" has been received. The analyzer application 412 can append "music" to the partial user input of "turn off the."

Additional or different triggering conditions may be used in other embodiments. Generally, a triggering condition is used by the analyzer application 412 to determine whether to identify the user input that is received at a point in time as a partial user input that can be processed to produce a response to the partial user input.

Figure 7A:
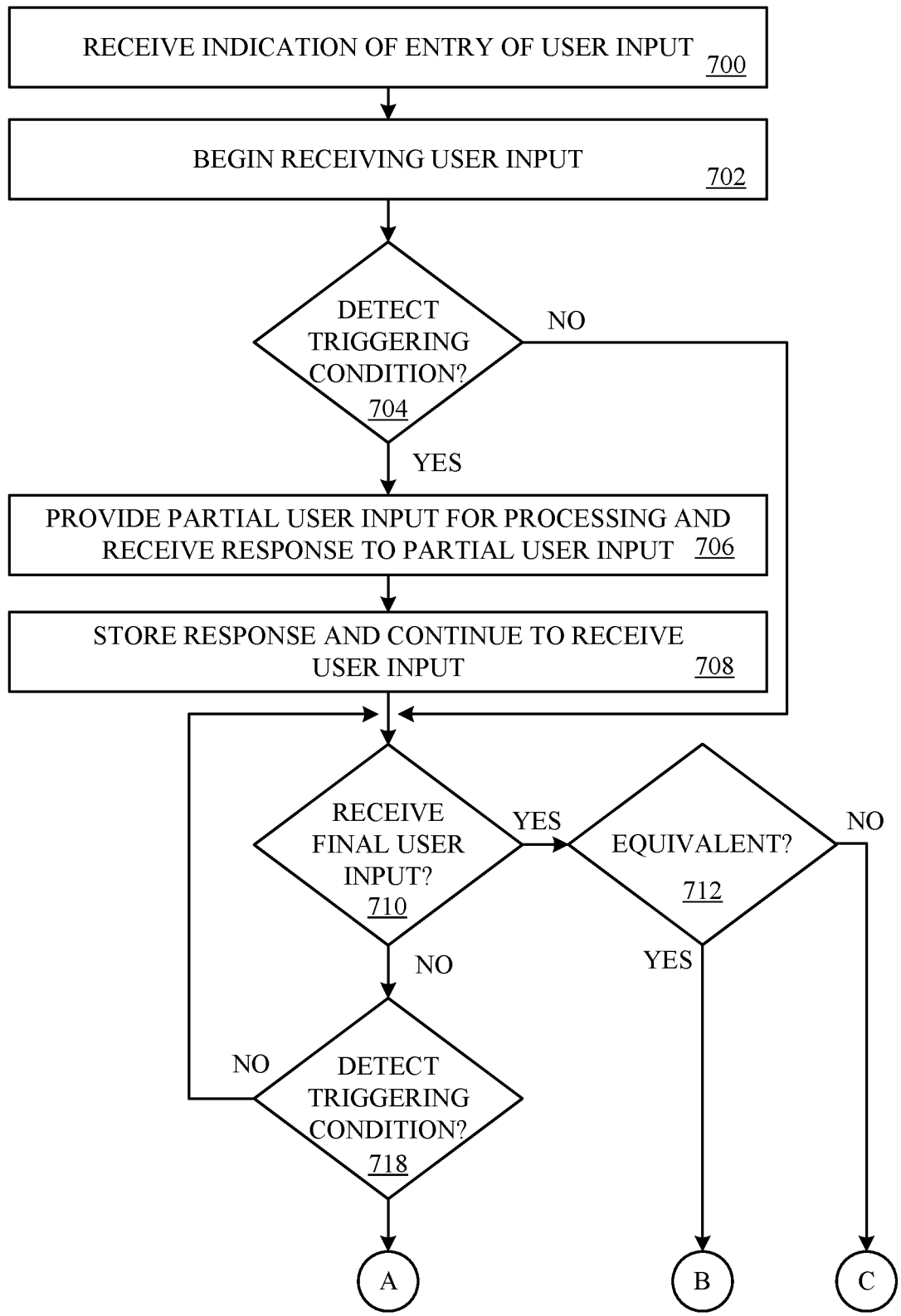
FIGS. 7A-7B illustrate a flowchart of a method of processing a user input in accordance with some embodiments.
Figure 7B:
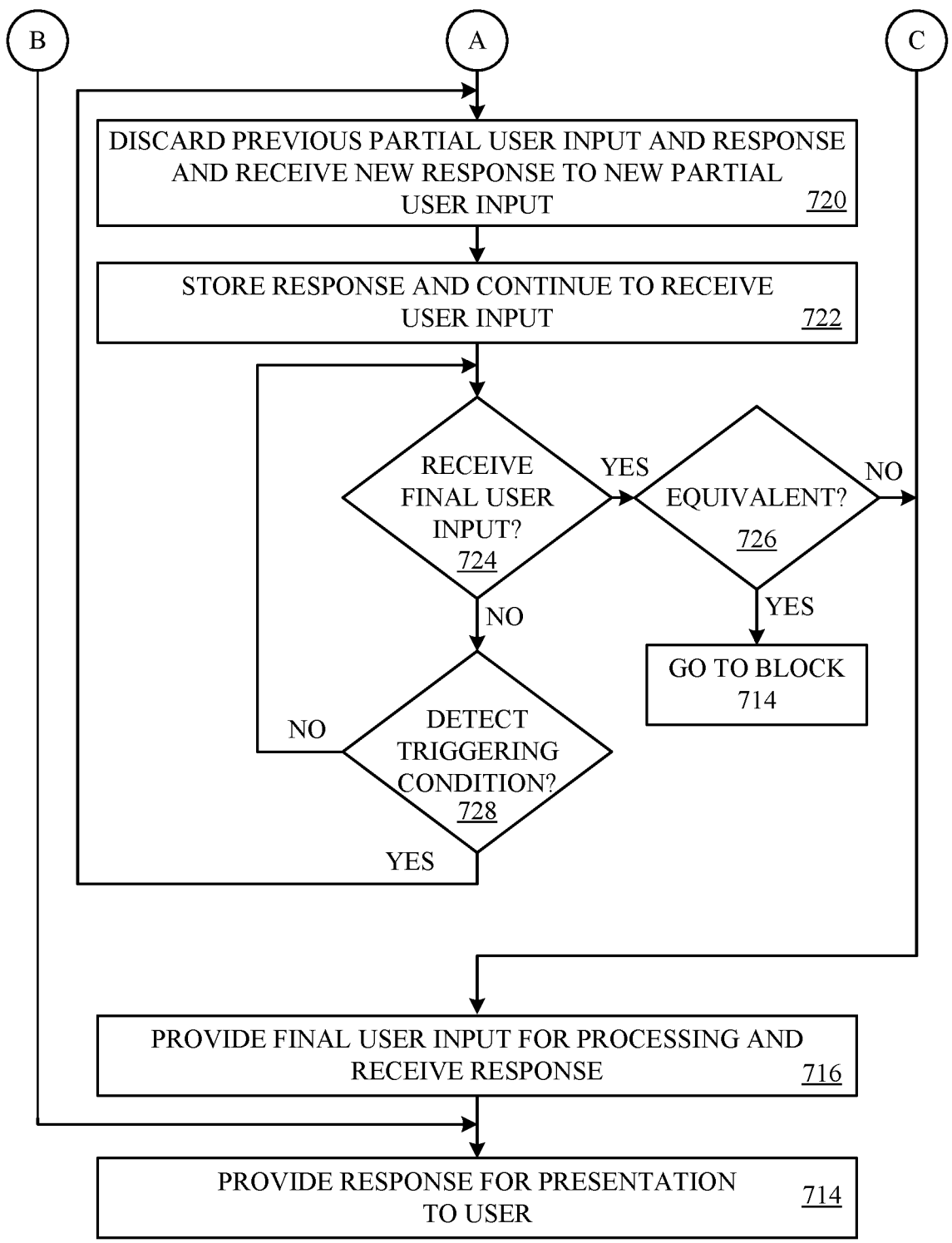

FIGS. 7A-7B illustrate a flowchart of a method of processing a user input in accordance with some embodiments. Initially, as shown in block 700, an indication that a user input is to be entered is received. For example, a user may activate a virtual assistant application or begin entering text into a search box presented in a graphical user interface of an application, such as a word processing application, a web browser application, or a search application.

Next, as shown in block 702, receipt of the user input (e.g., the text stream 602, 606 in FIG. 6) begins. A determination is made at block 704 as to whether one or more triggering conditions are detected. In one embodiment, the one or more triggering conditions are the example triggering conditions shown in FIG. 6. If a determination is made that one or more triggering conditions are detected, the method passes to block 706 where the partial user input (the part of the user input that has been received) is provided to an application for processing and a first response is received. The first response is stored (e.g., cached) as the user input continues to be received (block 708).

When a determination is made at block 704 that one or more triggering conditions have not been detected, or after block 708 has been performed, the method continues at block 710 where a determination is made as to whether the final user input has been received. In a non-limiting nonexclusive example, the determination may be based on not receiving the user input (e.g., the text stream 602, 606 in FIG. 6) for a given period of time. Alternatively, the determination can be based on the receipt of an "enter" or a "return" command.

If a determination is made that the final input has been received, the method passes to block 712 where a determination is made as to whether the partial user input processed at block 706 is equivalent to the final user input. As noted previously, a partial user input is "equivalent" to a final user input when the partial user input matches or is considered equivalent to the final user input. If a determination is made that the partial user input matches or is equivalent to the final user input, the method continues at block 714 where the response received at block 706 is provided (or caused to be provided) for presentation. For example, the response can be provided to one or more output devices.

When a determination is made at block 712 that the partial user input processed at block 706 does not match or is not equivalent to the final user input, the method continues at block 716 where the final user input is provided for processing and a response to the final user input is received. The response is then provided for presentation at block 714.

Returning to block 710, when a determination is made that the final user input has not been received, the method passes to block 718 where a determination is made as to whether one or more triggering conditions have been detected. If a determination is made that one or more triggering conditions have not been detected, the method returns to block 710. If a determination is made that one or more triggering conditions have been detected, the method passes to block 720 where the previous partial user input and the first response are discarded and the new partial user input is provided for processing and a response to the new partial user input is received. As discussed earlier, the new partial user input includes the prior partial input and the additional text that has been received when the triggering condition(s) is detected at block 718.

Next, as shown in block 722, the new response is stored (e.g., cached) as the user input continues to be received. A determination is made at block 724 as to whether the final user input has been received. If a determination is made that the final input has been received, the method continues at block 726 where a determination is made as to whether the partial user input processed at block 720 matches or is equivalent to the final user input. If a determination is made that the partial user input matches or is equivalent to the final user input, the method continues at block 714 where the response received at block 720 is provided (or caused to be provided) for presentation.

When a determination is made at block 726 that the partial user input processed at block 720 does not match or is not equivalent to the final user input, the method passes to block 716 where the final user input is provided for processing and a response to the final user input is received. The response is then provided for presentation at block 714.

Returning to block 724, when a determination is made that the final user input has not been received, the method continues at block 728 where a determination is made as to whether one or more triggering conditions have been detected. If a determination is made that one or more triggering conditions have not been detected, the method returns to block 724. If a determination is made that one or more triggering conditions have been detected, the method returns to block 720, where blocks 720, 722, 724, 728 repeat until the final user input is received.

Figure 8:
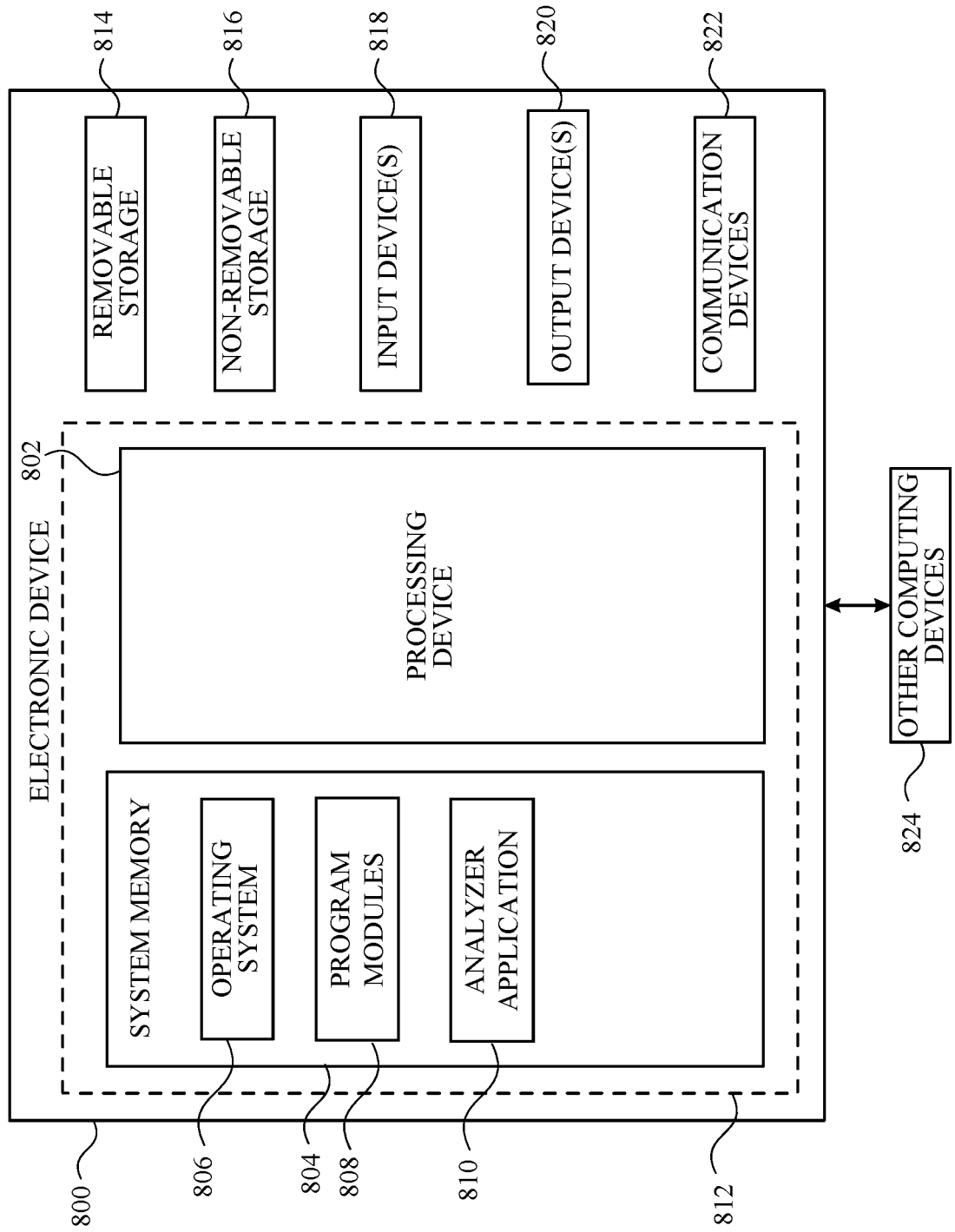
FIG. 8 illustrates a block diagram depicting example physical components of a computing device with which aspects of the disclosure may be practiced.
Figure 9A:
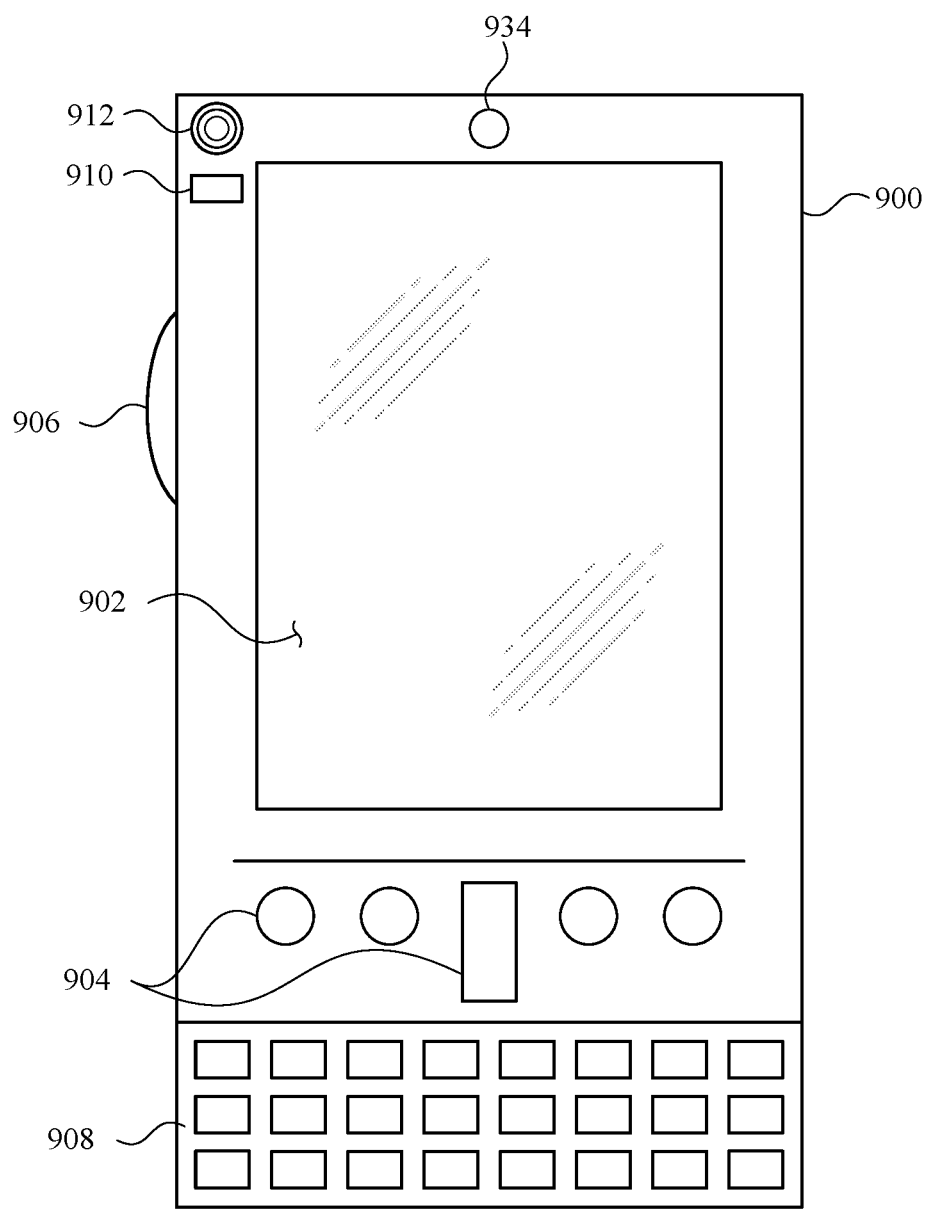
FIGS. 9A-9B illustrate block diagrams illustrating a mobile computing device with which aspects of the present disclosure may be practiced.
Figure 9B:
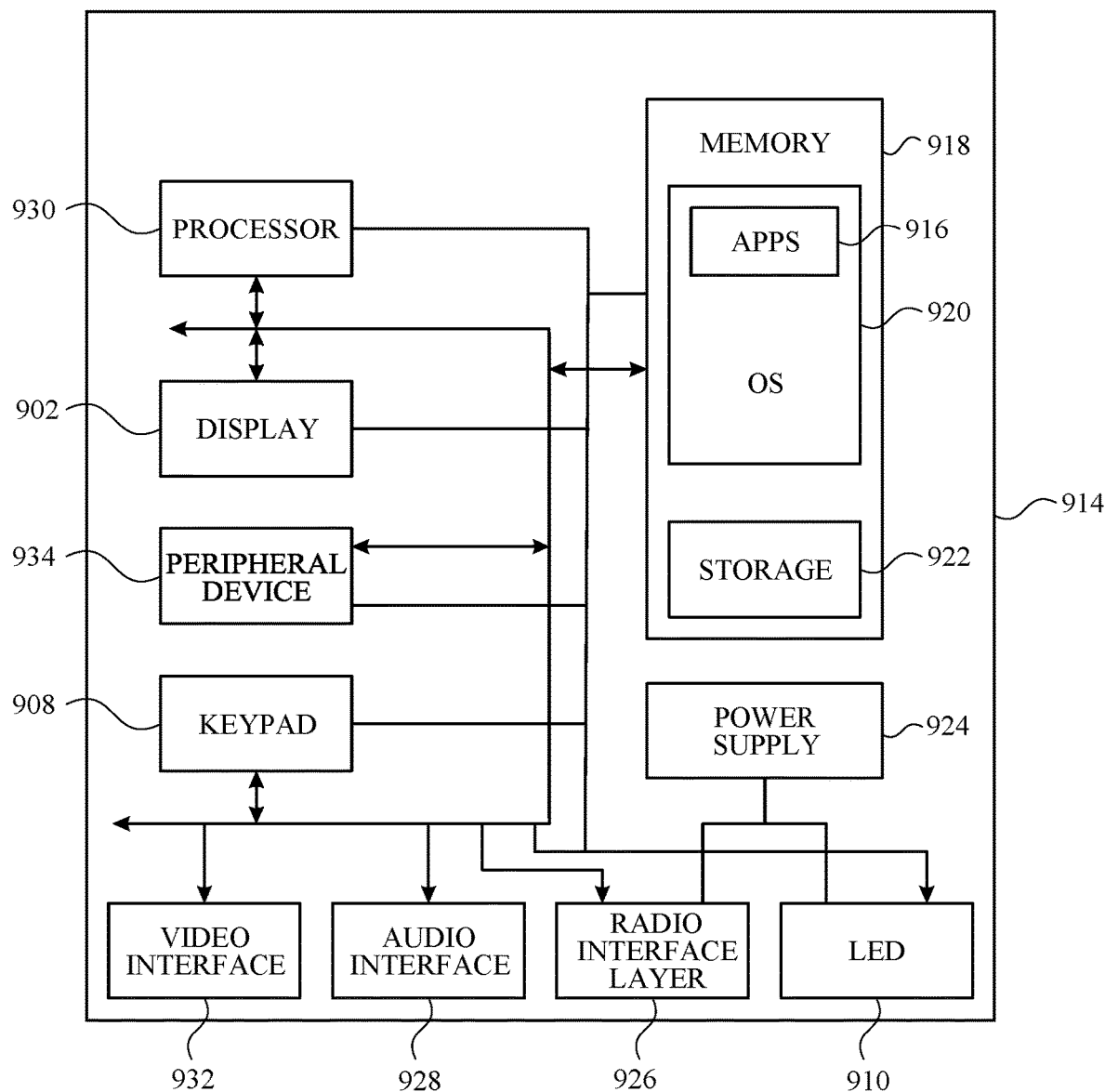
Figure 10:
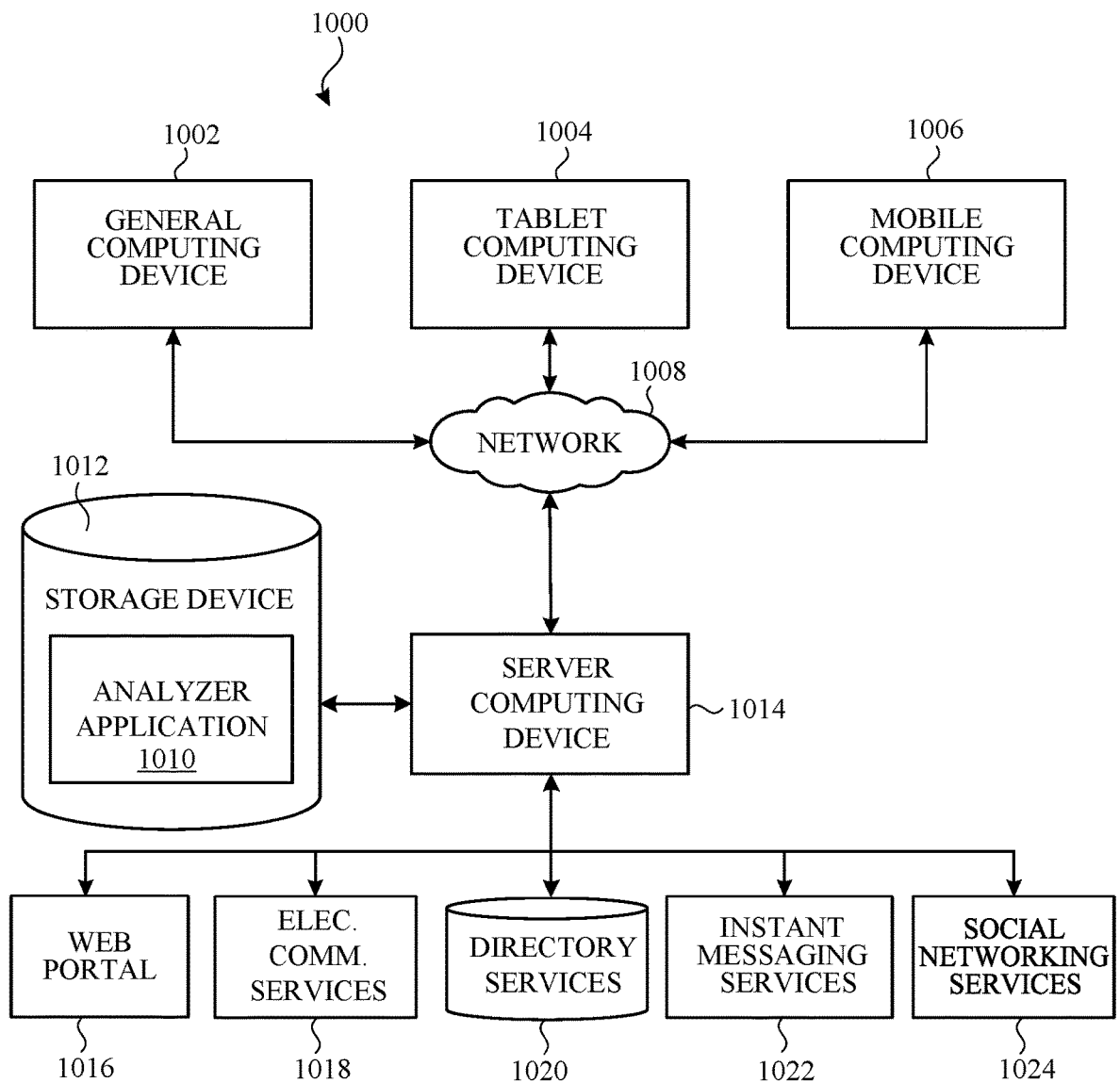
FIG. 10 illustrates a block diagram of a distributed computing system in which aspects of the present disclosure may be practiced.

FIGS. 8-10 and the associated descriptions provide a discussion of a variety of operating environments in which aspects of the disclosure may be practiced. However, the devices and systems illustrated and discussed with respect to FIGS. 8-10 are for purposes of example and illustration and are not limiting of a vast number of electronic device configurations that may be utilize for practicing aspects of the disclosure, as described herein.

FIG. 8 is a block diagram illustrating physical components (e.g., hardware) of an electronic device with which aspects of the disclosure may be practiced. In a basic configuration, the electronic device 800 may include at least one processing device 802 and a memory 804. Any suitable processing device 802 can be used. For example, the processing device 802 may be a microprocessor, an application specific integrated circuit, a field programmable gate array, or combinations thereof.

Depending on the configuration and type of the electronic device 800, the memory 804 may comprise, but is not limited to, volatile storage (e.g., random access memory), non-volatile storage (e.g., read-only memory), flash memory, or any combination of such memories. The memory 804 may include a number of program modules and data files, such as an operating system 806, program modules 808, and an analyzer application 810. While executing on the processing device 802, the analyzer application 810 may perform and/or cause to be performed processes including, but not limited to, the aspects as described herein.

The operating system 806, for example, may be suitable for controlling the operation of the electronic device 800. Furthermore, embodiments of the disclosure may be practiced in conjunction with a graphics library, other operating systems, or any other application program and is not limited to any particular application or system. This basic configuration is illustrated in FIG. 8 by those components within a dashed line 812.

The electronic device 800 may have additional features or functionality. For example, the electronic device 800 may also include additional data storage devices (removable and/or non-removable) such as, for example, magnetic disks, optical disks, or tape. Such additional storage is illustrated in FIG. 8 by a removable storage device 814 and a non-removable storage device 816.

The electronic device 800 may also have one or more input device(s) 818 such as a keyboard, a trackpad, a mouse, a pen, a sound or voice input device, a touch, force and/or swipe input device, etc. The output device(s) 820 such as a display, speakers, a printer, etc. may also be included. The aforementioned devices are examples and others may be used. The electronic device 800 may include one or more communication devices 822 allowing communications with other electronic devices 824. Examples of suitable communication devices 822 include, but are not limited to, radio frequency (RF) transmitter, receiver, and/or transceiver circuitry; universal serial bus (USB), parallel, and/or serial ports.

The term computer-readable media as used herein may include storage media or devices. The storage media or devices may include volatile and nonvolatile, removable, and non-removable media implemented in any method or technology for storage of information, such as computer readable instructions, data structures, or program modules.

The memory 804, the removable storage device 814, and the non-removable storage device 816 are all examples of storage devices. Each storage device may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the electronic device 800. Any such storage device may be part of the electronic device 800. In one embodiment, the storage device does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 8 may be integrated onto a single integrated circuit. Such an SOC device may include one or more processing units, graphics units, communications units, system virtualization units and various application functionality all of which are integrated (or "burned") onto the chip substrate as a single integrated circuit.

When operating via an SOC, the functionality described herein, with respect to the capability of client to switch protocols may be operated via application-specific logic integrated with other components of the electronic device 800 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general-purpose computer or in any other circuits or systems.

FIGS. 9A-9B illustrate a mobile electronic device 900, for example, a mobile telephone, a smart phone, wearable computer (such as a smart watch), a tablet computer, a laptop computer, and the like, with which embodiments of the disclosure may be practiced. With reference to FIG. 9A, one aspect of a mobile electronic device 900 for implementing the aspects described herein is illustrated.

In a basic configuration, the mobile electronic device 900 is a handheld computer having both input elements and output elements. The mobile electronic device 900 typically includes a display 902 and one or more input buttons 904 that allow the user to enter information into the mobile electronic device 900. The display 902 of the mobile electronic device 900 may also function as an input device (e.g., a display that accepts touch and/or force input).

If included, an optional side input element 906 allows further user input. The side input element 906 may be a rotary switch, a button, or any other type of manual input element. In alternative aspects, mobile electronic device 900 may incorporate more or less input elements. For example, the display 902 may not be a touch screen in some embodiments. In yet another alternative embodiment, the mobile electronic device 900 is a portable phone system, such as a cellular phone. The mobile electronic device 900 may also include an optional keypad 908. Optional keypad 908 may be a physical keypad or a "soft" keypad generated on the touch screen display.

In various embodiments, the output elements include the display 902 for showing a graphical user interface (GUI) of a client or developer portal, a visual indicator 910 (e.g., a light emitting diode), and/or an audio transducer 912 (e.g., a speaker). In some aspects, the mobile electronic device 900 incorporates a vibration transducer for providing the user with tactile feedback. In yet another aspect, the mobile electronic device 900 incorporates input and/or output ports, such as an audio input (e.g., a microphone jack), an audio output (e.g., a headphone jack), and a video output (e.g., a HDMI port) for sending signals to or receiving signals from an external device.

FIG. 9B is a block diagram illustrating the architecture of one aspect of a mobile electronic device 900. That is, the mobile electronic device 900 can incorporate a system (e.g., an architecture) 914 to implement some aspects. In one embodiment, the system 914 is implemented as a "smart phone" capable of running one or more applications (e.g., browser, e-mail, calendaring, contact managers, messaging clients, games, media clients/players, diagramming, and sharing applications and so on). In some aspects, the system 914 is integrated as an electronic device, such as an integrated personal digital assistant (PDA) and wireless phone.

One or more application programs 916 may be loaded into the memory 918 and run on or in association with the operating system 920. Examples of the application programs include a phone dialer program, an electronic communication program (e.g., email program, instant message program), a triggering application program, a word processing program, a spreadsheet program, an Internet browser program, and so forth.

The system 914 also includes a non-volatile storage area 922 within the memory 918. The non-volatile storage area 922 may be used to store persistent information that should not be lost when the system 914 is powered down.

The application programs 916 may use and store information in the non-volatile storage area 922, such as email, attachments or other messages used by an email application, and the like. A synchronization application (not shown) also resides on the system 914 and is programmed to interact with a corresponding synchronization application resident on a host computer to keep the information stored in the non-volatile storage area 922 synchronized with corresponding information stored at the host computer.

The system 914 has a power supply 924, which may be implemented as one or more batteries. The power supply 924 may further include an external power source, such as an AC adapter or a powered docking cradle that supplements or recharges the batteries.

The system 914 may also include a radio interface layer 926 that performs the function of transmitting and receiving radio frequency communications. The radio interface layer 926 facilitates wireless connectivity between the system 914 and the "outside world," via a communications carrier or service provider. Transmissions to and from the radio interface layer 926 are conducted under control of the operating system 920. In other words, communications received by the radio interface layer 926 may be disseminated to the application programs 916 via the operating system 920, and vice versa.

The visual indicator 910 may be used to provide visual notifications, and/or an audio interface 928 may be used for producing audible notifications via an audio transducer (e.g., audio transducer 912 illustrated in FIG. 9A). In the illustrated embodiment, the visual indicator 910 is a light emitting diode (LED) and the audio transducer 912 may be a speaker. These devices may be directly coupled to the power supply 924 so that when activated, they remain on for a duration dictated by the notification mechanism even though the processor 930 and other components might shut down for conserving battery power. The LED may be programmed to remain on indefinitely until the user takes action to indicate the powered-on status of the device.

The audio interface 928 is used to provide audible signals to and receive audible signals from the user (e.g., voice input such as described above). For example, in addition to being coupled to the audio transducer 912, the audio interface 928 may also be coupled to a microphone to receive audible input, such as to facilitate a telephone conversation.

The system 914 may further include a video interface 932 that enables an operation of peripheral device 934 (e.g., on-board camera) to record still images, video stream, and the like.

A mobile electronic device 900 implementing the system 914 may have additional features or functionality. For example, the mobile electronic device 900 may also include additional data storage devices (removable and/or non-removable) such as, magnetic disks, optical disks, or tape.

Such additional storage is illustrated in FIG. 9B by the non-volatile storage area 922.

Data/information generated or captured by the mobile electronic device 900 and stored via the system 914 may be stored locally on the mobile electronic device 900, as described above, or the data may be stored on any number of storage media that may be accessed by the device via the radio interface layer 926 or via a wired connection between the mobile electronic device 900 and a separate electronic device associated with the mobile electronic device 900, for example, a server-computing device in a distributed computing network, such as the Internet (e.g., server computing device 1014 in FIG. 10). As should be appreciated such data/information may be accessed via the mobile electronic device 900 via the radio interface layer 926 or via a distributed computing network. Similarly, such data/information may be readily transferred between electronic devices for storage and use according to well-known data/information transfer and storage means, including email and collaborative data/information sharing systems.

As should be appreciated, FIG. 9A and FIG. 9B are described for purposes of illustrating the present methods and systems and is not intended to limit the disclosure to a particular sequence of steps or a particular combination of hardware or software components.

FIG. 10 illustrates a block diagram of a distributed system in which aspects of the disclosure may be practiced. The system 1000 includes a general computing device 1002 (e.g., a desktop computer), a tablet computing device 1004, and/or a mobile computing device 1006. The general computing device 1002, the tablet computing device 1004, and the mobile computing device 1006 can each include the components, or be connected to the components, that are shown associated with the electronic device 800 in FIG. 8 or the mobile electronic device 900 in FIGS. 9A-9B.

The general computing device 1002, the tablet computing device 1004, and the mobile computing device 1006 are each configured to access one or more networks (represented by network 1008) to interact with the analyzer application 1010 stored in one or more storage devices (represented by storage device 1012) and executed on one or more server computing devices (represented by server computing device 1014). In some aspects, the server computing device 1014 can access and/or receive various types of services, communications, documents and information transmitted from other sources, such as a web portal 1016, an electronic communications services 1018, directory services 1020, instant messaging and/or text services 1022, and/or social networking services 1024. In some instances, these sources may provide robust reporting, analytics, data compilation and/or storage service, etc., whereas other services may provide search engines or other access to data and information, images, graphics, videos, document processing and the like.

As should be appreciated, FIG. 10 is described for purposes of illustrating the present methods and systems and is not intended to limit the disclosure to a particular sequence of steps or a particular combination of hardware or software components.

Aspects of the present disclosure, for example, are described above with reference to block diagrams and/or operational illustrations of methods, systems, GUIs, and computer program products according to aspects of the disclosure. As discussed earlier, the operations noted in the blocks may occur out of the order as shown in any flowchart. For example, two blocks shown in succession may in fact be executed substantially concurrently or the blocks may sometimes be executed in the reverse order, depending upon the functionality/acts involved. Additionally, the functionality or elements shown in one GUI can be used in another GUI, and vice versa.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternative aspects falling within the spirit of the broader aspects of the general inventive concept embodied in this application that do not depart from the broader scope of the claimed disclosure.

What is claimed is:

1. A method comprising:
receiving a partial user input that is a first portion of a statement or a question, the partial user input indicating a topic or subject matter of interest to a user;
during a time period in which the partial user input is received, detecting a triggering condition that is associated with the partial user input;
causing the partial user input to be processed;
receiving a response to the partial user input, the response providing a candidate answer for the statement or the question;
storing the response as the candidate answer;
receiving a remainder of user input to produce a final user input, wherein the remainder of the user input is a second portion of the statement or the question and the final user input is a combination of the partial user input and the remainder of the user input;
comparing the partial user input to the final user input to determine whether the partial user input is equivalent to the final user input; and
when a determination is made that the partial user input is equivalent to the final user input, providing the response to the partial user input for presentation.

2. The method of claim 1, wherein:
the response is a first response; and
the method further comprises:
when a determination is made that the partial user input is not equivalent to the final user input, causing the final user input to be processed;
receiving a second response to the final user input; and
providing the second response for presentation.

3. The method of claim 2, further comprising discarding the partial user input and the first response.

4. The method of claim 1, wherein:
the partial user input is received as a spoken user input; and
the method further comprises causing the spoken user input to be converted to text prior to detecting the triggering condition in the partial user input.

5. The method of claim 1, wherein:
the triggering condition is a first triggering condition;
the response is a first response;
the partial user input is a first partial user input; and the method further comprises:
    detecting a second triggering condition in the user input, wherein a third portion of the user input that is received when the second triggering condition is detected constitutes a second partial user input, the third portion being a sub-portion of the remainder of the user input;
    causing the second partial user input to be processed;
    receiving a second response to the second partial user input;
    determining whether the second partial user input is equivalent to the final user input; and
    when a determination is made that the second partial user input is equivalent to the final user input, providing the second response for presentation.

6. The method of claim 5, further comprising:
    when a determination is made that the second partial user input does is not equivalent to the final user input, causing the final user input to be processed;
    receiving a third response to the final user input; and
    providing the third response for presentation.

7. The method of claim 1, wherein an element for defining the triggering condition comprises a prosodic characteristic of the user input, the prosodic characteristic comprising one of a variation in an intonation, a stress pattern, a variation in loudness, or a variation in rhythm.

8. The method of claim 1, wherein the triggering condition comprises a time gap in the user input that meets or exceeds a predefined amount of time.

9. The method of claim 1, wherein the triggering condition comprises a predicted user input that represents an expected user input.

10. A system comprising:
    a processing device; and
    a storage device storing instructions, that when executed by the processing device, cause operations to be performed, the operations comprising:
        receiving a partial user input that is a first portion of a search query;
        detecting a first triggering condition that is associated with the partial user input;
        in response to detecting the first triggering condition, causing the partial user input to be processed;
        receiving a response to the partial user input, wherein the response is a candidate response for the search query;
        receiving a remainder of user input to produce a final user input, wherein the remainder of the user input is a second portion of the search query and the final user input is a combination of the partial user input and the remainder of the user input;
        detecting a second triggering condition that is associated with the remainder of the user input; and
        in response to detecting the second triggering condition and based on a determination that the partial user input matches or is similar to the final user input, providing the response to the partial user input for presentation.

11. The system of claim 10, wherein the storage device stores further instructions for analyzing, in at least substantially real time, the partial user input to detect the first triggering condition.

12. The system of claim 10, wherein:
    the response is a first response; and
    the storage device stores further instructions for:
        causing, based on a determination that the partial user input is not equivalent to the final user input, the final user input to be processed;
        receiving a second response to the final user input; and
        providing the second response for presentation.

13. The system of claim 10, wherein:
    the partial user input is received as a spoken user input; and
    the storage device stores further instructions for causing the spoken user input to be converted to text prior to detecting the first triggering condition in the partial user input.

14. The system of claim 10, wherein:
    the response is a first response;
    the partial user input is a first partial user input; and
    the storage device stores further instructions for:
        detecting a third triggering condition in the user input, wherein a third portion of the user input that is received when the third triggering condition is detected constitutes a second partial user input;
        causing the second partial user input to be processed;
        receiving a second response to the second partial user input; and
        based on a determination that the second partial user input is equivalent to the final user input, providing the second response for presentation.

15. The system of claim 14, wherein the storage device stores further instructions for:
    causing, based on a determination that the second partial user input is not equivalent to the final user input, the final user input to be processed;
    receiving a third response to the final user input; and
    providing the third response for presentation.

16. The system of claim 10, wherein the first triggering condition that is associated with the user input is included in a top N user inputs for a particular domain, where N is a number that equals or is greater than one.

17. The system of claim 10, wherein the first triggering condition comprises a characteristic of a geographic region associated with a user inputting the user input.

18. A device comprising:
    a processor;
    memory including instructions that, when executed by the processor, perform operations comprising:
        receiving a partial user input that is a first portion of a search query, the partial user input indicating at least one topic of interest;
        detecting a first triggering condition for the partial user input;
        in response to detecting the triggering condition, receiving a first response to the partial user input, wherein the first response is a search result for the search query, the search result being associated with the topic of interest;
        receiving a remainder of user input to produce a final user input, wherein the remainder of the user input is a second portion of the statement or the question and the final user input is a combination of the partial user input and the remainder of the user input;
        detecting a second triggering condition that is associated with the remainder of the user input; and
        when a determination is made that the partial user input matches or is similar to the final user input, providing the first response for presentation.

19. The device of claim 18, further comprising:
when a determination is made that the partial user input is not equivalent to the final user input, receiving a second response to the final user input; and
providing the second response for presentation.

20. The device of claim 18, wherein an element that is used to define the first triggering condition comprises at least one of:
a demographic characteristic associated with a user inputting the partial user input; or
a fluency of the partial user input.

\* \* \* \* \*